(No Model.)

H. C. SERGEANT.
VALVE AND VALVE GEAR FOR DIRECT ACTING ENGINES.

No. 538,048. Patented Apr. 23, 1895.

Witnesses:
C. J. Sundgren
George Barry

Inventor:
Henry C. Sergeant
by attorneys
Brown & Seward

United States Patent Office.

HENRY C. SERGEANT, OF WESTFIELD, NEW JERSEY, ASSIGNOR TO THE INGERSOLL-SERGEANT DRILL COMPANY, OF NEW YORK, N. Y.

VALVE AND VALVE-GEAR FOR DIRECT-ACTING ENGINES.

SPECIFICATION forming part of Letters Patent No. 538,048, dated April 23, 1895.

Application filed January 12, 1895. Serial No. 534,625. (No model.)

*To all whom it may concern:*

Be it known that I, HENRY CLARK SERGEANT, of Westfield, in the county of Union and State of New Jersey, have invented a new and useful Improvement in Valves and Valve-Gear for Direct-Action Engines, of which the following is a specification.

This invention relates more especially to valves and valve gear which are or may be applicable to direct-action engines generally but which are more especially applicable to rock drilling engines, and it relates particularly to valves which are operated by a three-armed oscillating lever actuated by tappet surfaces on the piston of the engine.

Such valves as heretofore constructed have had straight faces and straight sides and that arm of the lever which engages with the valve moving in arcs while the valve moves in straight lines, not only was there considerable friction between the said arm and the valve and consequently considerable wear at the points of their engagement, but the arm exerted a tendency to draw the valve toward its seat and consequently to produce unnecessary friction between the valve and seat.

The object of this invention is to remedy this defect.

I will now proceed to describe my invention with reference to the accompanying drawings, and afterward point out its novelty in a claim.

Figure 1:
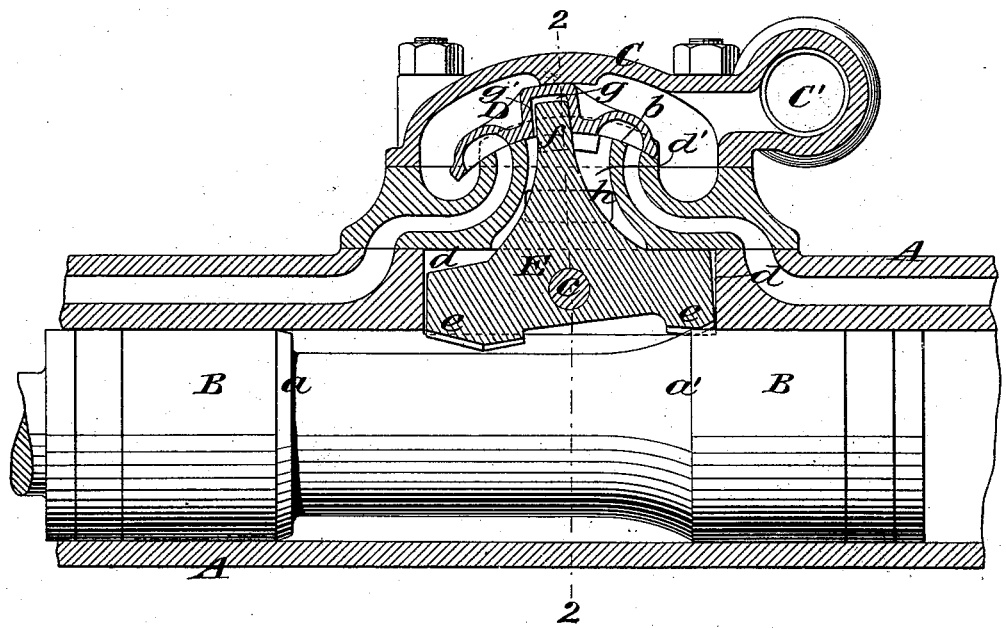
Figure 2:
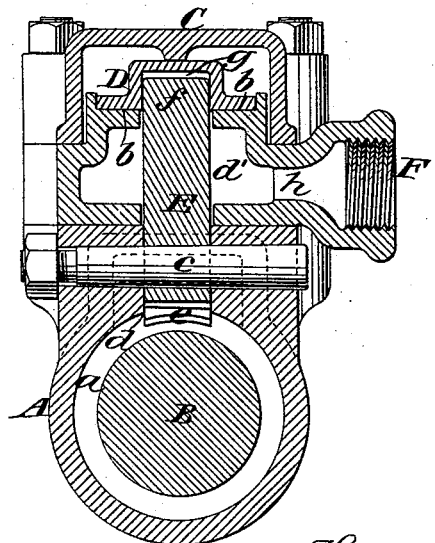

Figure 1 represents a longitudinal section of a portion of the cylinder and of the valve-chest, valve and valve gear of a rock-drilling engine embodying my invention. Fig. 2 represents a transverse section in the line 2, 2, of Fig. 1.

Similar letters of reference designate corresponding parts in both the figures.

A designates a portion of the engine cylinder, and B the piston having an annular recess between its heads, the ends $a$ $a'$ of the said recess constituting tappet surfaces.

C is the valve-chest to which the steam or other motive fluid is supplied through the opening C'.

D is the valve and $b$ its seat.

E is the three-armed valve-operating lever, and $c$ the stationary pin on which the said lever oscillates. The lever E works as is usual, within an opening $d$ in the top or one side of the cylinder, its two tappet arms $e$ $e$ entering the bore of the cylinder and its valve actuating arm $f$ projecting outward from the opening $d$ in the cylinder through a corresponding opening $d'$ in the valve-seat and projecting beyond the valve-seat into a recess $g$ provided for it in the valve. The openings $d$ $d'$ of the cylinder and valve-chest are in communication by a side passage $h$ with the exhaust opening F.

The valve D represented is what is known as the double D kind, but the arrangement of its ports and the ports in its seat are immaterial to my invention. The valve-seat $b$ is of the form of a convex cylindrical arc the center or axis of which is coincident with the axis of the pin $c$ upon which the three-armed lever E oscillates. The face of the valve is in the form of a corresponding concave cylindrical arc. The operative faces of the arm $f$ of the lever and the corresponding faces of the recess $g$ in the valve are represented as of flat form, so that the contact between the said faces of the arm $f$ and the faces of the recess $g$ is distributed over a considerable surface.

By reason of the faces of the valve and its seat being in the form of arcs the axis of which is coincident with the axis of oscillation of the lever E, the arm $f$ operates on the valve with a dead push and without any friction and without any tendency of the end of the valve-operating arm to wear cavities in those faces in the recess of the valve against which they operate and to hook itself into those cavities in such manner as to pull the valve toward its seat which has been a great defect with flat valves operated by such a lever. The absence of friction between the arm $f$ and the valve permits a larger area of contact between the operating faces of the arm $f$ and the corresponding faces of the recess $g$ in the valve and this permits the cavity to be made so much wider than the tappet arm as indicated at $g'$ in Fig. 1, that the valve may have a stroke considerably longer than the arm $f$ which is of considerable advantage as the length of oscillation of the lever is necessarily limited.

What I claim as my invention is—

The combination with an engine cylinder and a piston therein provided with tappet surfaces, of a valve-seat having a convex arc-formed profile, a valve having a corresponding concave profile and a three-armed oscillating lever having its axis of oscillation coincident with the center of the arc of the valve and seat, one of the arms of said lever engaging with the valve and the other two constituting tappets to be acted upon by the tappet surfaces of the piston, substantially as herein set forth.

HENRY C. SERGEANT.

Witnesses.
FREDK. HAYNES,
LIDA M. EGBERT.